US012549299B2

(12) United States Patent
Yalamalli et al.

(10) Patent No.: US 12,549,299 B2
(45) Date of Patent: Feb. 10, 2026

(54) SYSTEM AND METHOD CARRIER AGGREGATION TRANSPORT BLOCK PREPARATION

(71) Applicant: RAKUTEN SYMPHONY, INC., Tokyo (JP)

(72) Inventors: Vijayakumar Yalamalli, Bangalore (IN); Mannarapu Venkata Sandeep Kumar, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 370 days.

(21) Appl. No.: 18/247,271

(22) PCT Filed: Dec. 29, 2022

(86) PCT No.: PCT/US2022/054249
§ 371 (c)(1),
(2) Date: Mar. 30, 2023

(87) PCT Pub. No.: WO2024/144783
PCT Pub. Date: Jul. 4, 2024

(65) Prior Publication Data
US 2025/0080293 A1 Mar. 6, 2025

(51) Int. Cl.
*H04L 5/00* (2006.01)

(52) U.S. Cl.
CPC ............ *H04L 5/0044* (2013.01); *H04L 5/001* (2013.01)

(58) Field of Classification Search
CPC ..... H04L 5/0044; H04L 5/001; H04L 1/1819; H04L 69/324; H04W 72/1273; H04W 28/14; H04W 72/23; H04W 76/15
See application file for complete search history.

(56) References Cited

U.S. PATENT DOCUMENTS

| 2013/0201815 A1* | 8/2013 | Lin ...................... H04L 49/9005 370/216 |
| 2013/0329661 A1* | 12/2013 | Chen ................. H04W 72/0453 370/328 |
| 2016/0057774 A1* | 2/2016 | Ahn ....................... H04W 72/23 370/329 |

(Continued)

FOREIGN PATENT DOCUMENTS

| CN | 105027517 A | * 11/2015 | ............ H04W 72/56 |
| EP | 3439361 B1 | * 8/2020 | ............ H04W 72/51 |

(Continued)

OTHER PUBLICATIONS

M. Irazabal, E. Lopez-Aguilera, I. Demirkol, R. Schmidt and N. Nikaein, "Preventing RLC Buffer Sojourn Delays in 5G," in IEEE Access, vol. 9, pp. 39466-39488, 2021 (Year: 2021).*

*Primary Examiner* — Ayaz R Sheikh
*Assistant Examiner* — Louis Samara
(74) *Attorney, Agent, or Firm* — HAUPTMAN HAM, LLP (57) ABSTRACT

A method, includes processing, by processing circuitry, in parallel, a transport block size (TBS) for a transport block (TB) of two or more carriers, where the TB is payload on each carrier for user equipment (UE) in communication with the two or more carriers; storing, by the processing circuitry, processed TBS for each carrier in a common data queue; and sending, by the processing circuitry, TBs for each carrier for L1 processing in preparation of the TBs being sent to the UE.

14 Claims, 3 Drawing Sheets

(56) References Cited

U.S. PATENT DOCUMENTS

| | | | | |
|---|---|---|---|---|
| 2017/0245178 A1* | 8/2017 | Nobukiyo | ............ | H04W 28/14 |
| 2018/0124851 A1* | 5/2018 | Iyer | ...................... | H04W 76/15 |
| 2021/0377091 A1* | 12/2021 | Zach | .................... | H04W 72/23 |
| 2022/0104213 A1* | 3/2022 | Song | ................... | H04W 72/121 |
| 2022/0286906 A1* | 9/2022 | Bathwal | ............... | H04W 72/21 |
| 2022/0368782 A1* | 11/2022 | Ma | ....................... | H04L 69/324 |
| 2024/0214136 A1* | 6/2024 | Xue | ..................... | H04L 5/0005 |

FOREIGN PATENT DOCUMENTS

| | | | | |
|---|---|---|---|---|
| KR | 102481482 B1 * | 12/2022 | .......... | H04L 5/0007 |
| WO | WO-2021231522 A1 * | 11/2021 | .......... | H04L 1/1822 |

* cited by examiner

SYSTEM AND METHOD CARRIER AGGREGATION TRANSPORT BLOCK PREPARATION

RELATED APPLICATIONS

The present application is a National Phase of International Application No. PCT/US2022/054249 filed Dec. 29, 2022.

TECHNICAL FIELD

This description relates to a system for transport block preparation during carrier aggregation and method of using the same.

BACKGROUND

A cellular network is a telecommunication system of mobile devices (e.g., mobile phone devices) that communicate by radio waves through one or more local antenna at a cellular base station (e.g., cell tower). Cellular service is provided to coverage areas that are divided into small geographical areas called cells. Each cell is served by a separate low-power-multichannel transceiver and antenna at a cell tower. Mobile devices within a cell communicate through that cell's antenna on multiple frequencies and on separate frequency channels assigned by the base station from a pool of frequencies used by the cellular network.

A radio access network (RAN) is part of the telecommunication system and implements radio access technology. RANs reside between a device, such as a mobile phone, a computer, or remotely controlled machine, and provide connection with a core network (CN). Depending on the standard, mobile phones and other wireless connected devices are varyingly known as user equipment (UE), terminal equipment (TE), mobile station (MS), and the like.

SUMMARY

In some embodiments, a method, includes processing, by processing circuitry, in parallel, a transport block size (TBS) for a transport block (TB) of two or more carriers, where the TB is payload on each carrier for user equipment (UE) in communication with the two or more carriers; storing, by the processing circuitry, processed TBS for each carrier in a common data queue; and sending, by the processing circuitry, TBs for each carrier for L1 processing in preparation of the TBs being sent to the UE.

In some embodiments, an apparatus, includes a processor; and a memory having instructions stored thereon that, in response to being executed by the processor, cause the apparatus to process in parallel a transport block size (TBS) for a transport block (TB) of two or more carriers, where the TB is payload for user equipment (UE) on each carrier in communication with the two or more carriers; store processed TBS for each carrier in a common data queue; and send TBs for each carrier for L1 processing in preparation of the TBs being sent to the UE.

In some embodiments, a non-transitory computer readable medium having instructions stored thereon that, in response to being executed by a processor, cause an apparatus to process in parallel, a transport block size (TBS) for a transport block (TB) of two or more carriers, where the TB is payload for user equipment (UE) in communication with the two or more carriers; store processed TBS for each carrier in a common data queue; and send TBs for each carrier for L1 processing in preparation of the TBs being sent to the UE.

BRIEF DESCRIPTION OF THE DRAWINGS

Aspects of the embodiments are understood from the following detailed description when read with the accompanying Figures. In accordance with the standard practice in the industry, various features are not drawn to scale. In some embodiments, dimensions of the various features are arbitrarily increased or reduced for clarity of discussion.

DETAILED DESCRIPTION

The following disclosure provides many different embodiments, or examples, for implementing distinctive features of the discussed subject matter. Examples of components, values, operations, materials, arrangements, or the like, are described below to simplify the embodiments. These are, of course, examples and are unintended to be limiting. Other components, values, operations, materials, arrangements, or the like, are contemplated. For example, the formation of a first feature over or on a second feature in the description that follows include embodiments in which the first and second features are formed in direct contact, and further include embodiments in which additional features are formed between the first and second features, such that the first and second features are unable to be in direct contact. In addition, some embodiments repeat reference numerals and/or letters in the numerous examples. This repetition is for the purpose of simplicity and clarity and is unintended to dictate a relationship between the various embodiments and/or configurations discussed.

Further, spatially relative terms, such as beneath, below, lower, above, upper and the like, are used herein for ease of description to describe one element or feature's relationship to another element(s) or feature(s) as illustrated in the Figures. The spatially relative terms are intended to encompass different orientations of the device in use or operation in addition to the orientation depicted in the Figures. The apparatus is otherwise oriented (rotated 90 degrees or at other orientations) and the spatially relative descriptors used herein likewise are interpreted accordingly.

In some embodiments, carrier aggregation transport block (TB) preparation is discussed. CA is a technique that is used in wireless communication to increase the data rate per user (throughput), whereby multiple frequency blocks (called carriers) from multiple base stations are assigned to the same user (e.g., same UE). The maximum possible data rate per user is increased the more frequency blocks (e.g., base stations) that are assigned to a UE. The sum data rate of a cell (area of coverage for a base station) is increased as well because of better resource utilization. CA is described in detail in the 3rd generation partnership project (3GPP) standards specifications.

The TB is the payload which is passed between the MAC (media access control provides flow control and multiplexing for a transmission medium) and Phy Layers (physical layers connect the MAC to a physical medium such as an optical fiber or copper cable), specifically for the shared data channel such as PDSCH (is the physical downlink channel that carries user data) and PUSCH (is the physical uplink channel that carries user data). A TB undergoes Phy layer processing at a transmitter before being mapped onto the PDSCH for transmission over the air interface. A TB is added with cyclic redundancy check (CRC is an error-detecting code commonly used in digital networks and storage devices to detect accidental changes to digital data) and segmented into code blocks that are placed into slots. In long-term evolution (LTE) TB preparation a slot is one millisecond in which internet protocol (IP) packets (payload) for a UE are located. In 5G New Radio (NR) where the transmission frequency is approximately six GHz, the slot duration is half a millisecond to allocate X number of bytes to a UE. This is time enough for approximately ten IP packets being put into a slot right which forms a TB. That is the TB which is used to be transmitted at the physical layer (e.g., L1).

Network throughput (or just throughput) refers to the rate of successful message delivery over a communication channel, such as Ethernet or packet radio, in a communication network. The data that these messages contain is delivered over physical or logical links, or through network nodes. Throughput is usually measured in bits per second (bit/s or bps), and sometimes in data packets per second (p/s or pps) or data packets per time slot. The system throughput or aggregate throughput is the sum of the data rates that are delivered to terminals in a network. Throughput is synonymous to digital bandwidth consumption.

In some embodiments, network implementation is made more efficient in response to carriers being able to use a common data queue. In computer science, a queue is a collection of entities that are maintained in a sequence and modified by the addition of entities at one end of the sequence and the removal of entities from the other end of the sequence. By convention, the end of the sequence at which elements are added is called the back, tail, or rear of the queue, and the end at which elements are removed is called the head or front of the queue. The operation of adding an element to the rear of the queue is known as enqueue, and the operation of removing an element from the front is known as dequeue. The operations of a queue make it a first-in-first-out (FIFO) data structure. In a FIFO data structure, the first element added to the queue is the first one to be removed. This is equivalent to the requirement that once a new element is added, all elements that were added before have to be removed before the new element is removed. Queues perform the function of a buffer.

In operation, a UE calls for a continuous radio link control (RLC) sequence number (SN) per carrier implemented at a gNodeB (GNB is a 3GPP-compliant implementation of the 5G-NR base station). The SN field indicates the sequence number of the corresponding RLC (service data unit) SDU. For RLC AM, the sequence number is incremented by one for every RLC SDU.

RLC is a layer 2 radio link protocol used in UMTS, LTE, and 5G on the air interface. This protocol is specified by 3GPP in TS 25.322 for UMTS, TS 36.322 for LTE and TS 38.322 for 5G NR. RLC is located on top of the 3GPP MAC-layer and below the (packet data convergence protocol) PDCP-layer. The main tasks of the RLC protocol are: (1) transfer of upper layer Protocol Data Units (PDUs) in one of three modes: Acknowledged Mode (AM), Unacknowledged Mode (UM) and Transparent Mode (TM), (2) error correction through ARQ (only for AM data transfer), (3) concatenation, segmentation and reassembly of RLC SDUs (UM and AM), (4) re-segmentation of RLC data PDUs (AM), (5) reordering of RLC data PDUs (UM and AM); (6) duplicate detection (UM and AM); (7) RLC SDU discard (UM and AM), (8) RLC re-establishment, and (9) protocol error detection and recovery.

In other approaches, each carrier has a queue which results in multiple queues holding continuous RLC packets. Implementing a queue for each carrier means packets (the payload to TB) are split, assigned sequence numbers for the carrier, stored at the individual carrier (e.g., the base station), and then sent out to the UE.

In some embodiments, a common queue is used across one or more carriers. Carrier TB (transport block) preparation is executed in parallel with a common queue.

Dequeuing from the common queue is performed in bulk based on an estimated average packet size and an allocated TBS (transport block size). A UE receiving data on the PDSCH determines the TBS before attempting to decode the data. The UE uses a combination of semi-static information provided by the RRC (Radio Resource Control is a layer 3 (Network Layer) protocol used between UE and base station) signalling and dynamic information provided by Downlink Control Information (DCI provides the UE with information such as physical layer resource allocation, power control commands, HARQ information for both uplink and downlink) on the PDCCH.

In other approaches, with each carrier having a separate queue, special handling is called for based on different channel conditions for each carrier and carrier deactivation. A common queue removes that call for special handling.

In some embodiments, the CA implementation is simplified over other approaches. In some embodiments, the carriers begin the TB preparation in parallel. To access the queue, carriers use bulk dequeue (e.g., N number of packets are dequeued at once), based on the allocated TBS and average packet size. The bulk dequeue function is protected mutex and this is a short duration process where the carrier is serialized (e.g., given a sequential number).

In computer science, a lock or mutex (from mutual exclusion) is a synchronization primitive (e.g., a mechanism that enforces limits on access to a resource when there are many threads of execution). A lock is designed to enforce a mutual exclusion concurrency control policy, and with a variety of possible methods there exists multiple unique implementations for different applications.

In some embodiments, as packets are within the common queue, handling of CA deactivation handled more efficiently compared with prior approaches. In response to dequeue of the RLC/MAC header, the updating per packet of the RLC/MAC header and TB preparation runs in parallel. In some embodiments, M number of packets per carrier are dequeued. The number represented by M depends on the grants given by the scheduler. The additional or segmented packet is stored in the UE's carrier context and is transmitted on next DL (downlink) scheduling occasion.

Figure 1:
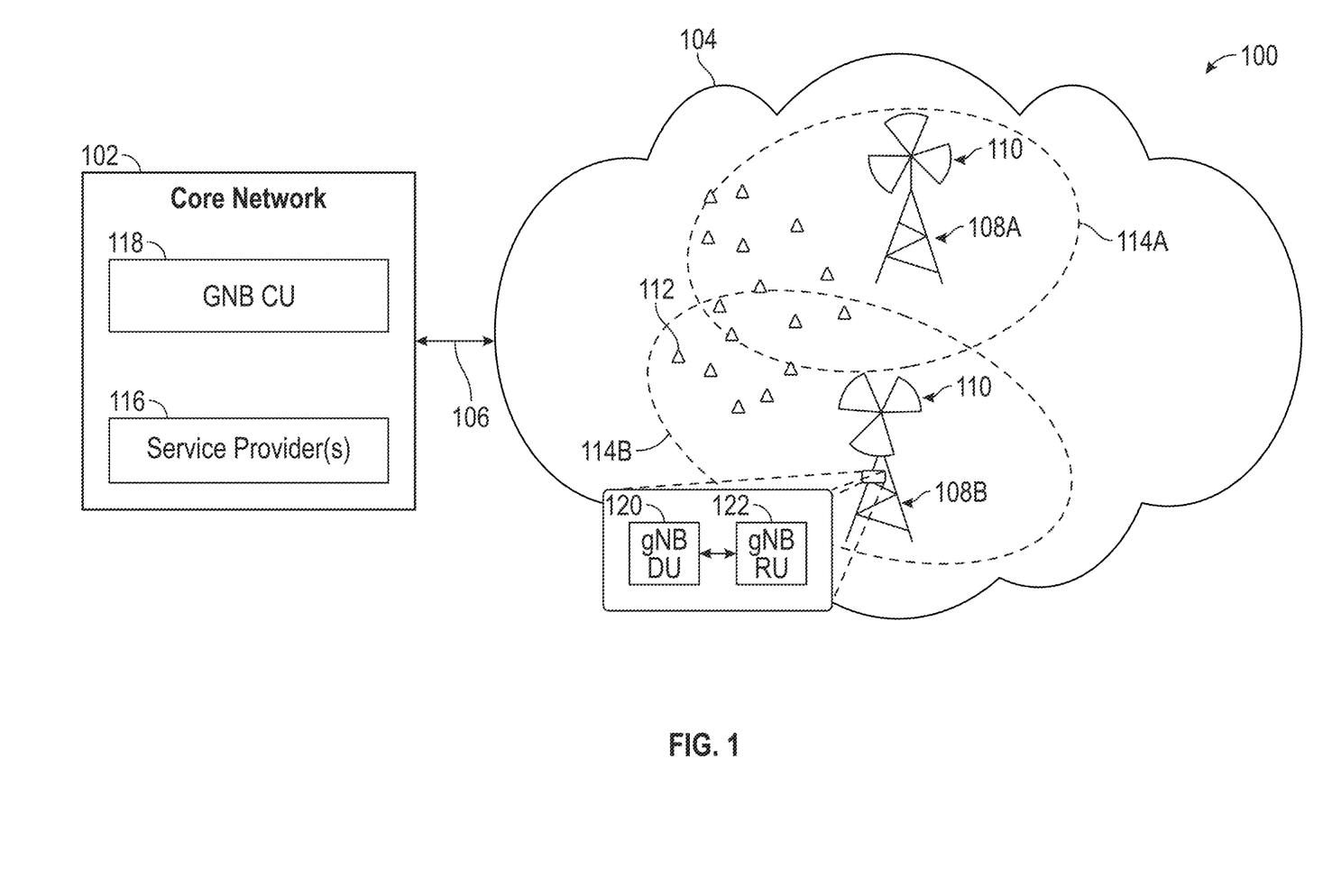
FIG. 1 is a diagrammatic representation of a system for carrier aggregation transport block preparation (CATBP), in accordance with some embodiments.

FIG. 1 is a diagrammatic representation of a system for carrier aggregation transport block preparation (CATBP) 100, in accordance with some embodiments.

CATBP system 100 includes a CN 102 communicatively connected to RAN 104 through transport network 106, which is communicatively connected to base stations 108A and 108B (hereinafter base station 108), with antennas 110 that are wirelessly connected to UEs 112 located in geographic coverage cells 114A and 114B (hereinafter geographic coverage cells 114). CN 102 includes one or more service provider(s) 116.

CN 102 (further known as a backbone) is a part of a computer network which interconnects networks, providing a path for the exchange of information between different local area networks (LANs) or subnetworks. In some embodiments, CN 102 ties together diverse networks over wide geographic areas, in different buildings in a campus environment, or in the same building.

In some embodiments, RAN 104 is a global system for mobile communications (GSM) RAN, a GSM/EDGE RAN, a universal mobile telecommunications system (UMTS) RAN (UTRAN), an evolved UMTS terrestrial radio access network (E-UTRAN), open RAN (O-RAN), or cloud-RAN (C-RAN). RAN 104 resides between UE 112 (e.g., mobile phone, a computer, or any remotely controlled machine) and CN 102. In some embodiments, RAN 104 is a C-RAN for purposes of simplified representation and discussion. In some embodiments, base band units (BBU) replace the C-RAN.

In a hierarchical telecommunications network, transport network 106 of CATBP 100 includes the intermediate link(s) between CN 102 and RAN 104. The two main methods of mobile backhaul implementations are fiber-based backhaul and wireless point-to-point backhaul. Other methods, such as copper-based wireline, satellite communications and point-to-multipoint wireless technologies are being phased out as capacity and latency requirements become higher in 4G and 5G networks. Backhaul refers to the side of the network that communicates with the Internet. The connection between base station 108 and UE 112 begins with transport network 106 connected to CN 102. In some embodiments, transport network 106 includes wired, fiber optic, and wireless components. Wireless sections include using microwave bands, mesh, and edge network topologies that use high-capacity wireless channels to get packets to the microwave or fiber links.

In some embodiments, base stations 108 are gNB base stations that connect 5G New Radio (NR) devices (e.g., 5G phones) to the 5G core network using the NR radio interface. In some embodiments, base stations 108 are lattice or self-supported towers, guyed towers, monopole towers, and concealed towers (e.g., towers designed to resemble trees, cacti, water towers, signs, light standards, and other types of structures). In some embodiments, base stations 108 are a cellular-enabled mobile device site where antennas and electronic communications equipment are placed, typically on a radio mast, tower, or other raised structure to create a cell (or adjacent cells) in a network. The raised structure typically supports antenna(s) 110 and one or more sets of transmitter/receivers (transceivers), digital signal processors, control electronics, a remote radio head (RRH), primary and backup electrical power sources, and sheltering. Base stations are known by other names such as base transceiver station, mobile phone mast, or cell tower. In some embodiments, other edge devices are configured to wirelessly communicate with UEs. The edge device provides an entry point into service provider CNs, such as CN 102. Examples include routers, routing switches, integrated access devices (IADs), multiplexers, and a variety of metropolitan area network (MAN) and wide area network (WAN) access devices.

In at least one embodiment, antenna(s) 110 are a sector antenna. In some embodiments, antenna(s) 110 are a type of directional microwave antenna with a sector-shaped radiation pattern. In some embodiments, the sector degrees of arc are 60°, 90°, or 120° designs with a few degrees extra to ensure overlap. Further, sector antennas are mounted in multiples when wider coverage or a full-circle coverage is desired. In some embodiments, antenna(s) 110 are a rectangular antenna, sometimes called a panel antenna or radio antenna, used to transmit and receive waves or data between mobile devices or other devices and a base station. In some embodiments, antenna(s) 110 are circular antennas. In some embodiments, antenna 110 operates at microwave or ultra-high frequency (UHF) frequencies (300 MHz to 3 GHz). In other examples, antenna(s) 110 are chosen for their size and directional properties. In some embodiments, the antenna(s) 110 are MIMO (multiple-input, multiple-output) antennas that send and receive greater than one data signal simultaneously over the same radio channel by exploiting multipath propagation.

In some embodiments, UEs 112 are a computer or computing system. Additionally, or alternatively, UEs 112 have a liquid crystal display (LCD), light-emitting diode (LED) or organic light-emitting diode (OLED) screen interface, such as user interface (UI) 322 (FIG. 3), providing a touchscreen interface with digital buttons and keyboard or physical buttons along with a physical keyboard. In some embodiments, UE 112 connects to the Internet and interconnects with other devices. Additionally, or alternatively, UE 112 incorporates integrated cameras, the ability to place and receive voice and video telephone calls, video games, and Global Positioning System (GPS) capabilities. Additionally, or alternatively, UEs run operating systems (OS) that allow third-party apps specialized for capabilities to be installed and run. In some embodiments, UEs 112 are a computer (such as a tablet computer, netbook, digital media player, digital assistant, graphing calculator, handheld game console, handheld personal computer (PC), laptop, mobile Internet device (MID), personal digital assistant (PDA), pocket calculator, portable medial player, or ultra-mobile PC), a mobile phone (such as a camera phone, feature phone, smartphone, or phablet), a digital camera (such as a digital camcorder, or digital still camera (DSC), digital video camera (DVC), or front-facing camera), a pager, a personal navigation device (PND), a wearable computer (such as a calculator watch, smartwatch, head-mounted display, earphones, or biometric device), or a smart card.

In some embodiments, geographic coverage cells 114 include a shape and size. In some embodiments, geographic coverage cells 114 are a macro-cell (covering 1 Km-30 Km), a micro-cell (covering 200 m-2 Km), or a pico-cell (covering 4 m-200 m). In some embodiments, geographic coverage cells are circular, oval (FIG. 1), sector, or lobed in shape, but geographic coverage cells 114 are configured in most any shape or size. Geographic coverage cells 114 represent the geographic area antenna 110 and UEs 112 are configured to communicate.

Service provider(s) 116 or CSPs are businesses, vendors, customers, or organizations that sell bandwidth or network access to subscribers (utilizing UEs) by providing direct Internet backbone access to Internet service providers and usually access to network access points (NAPs). Service providers are sometimes referred to as backbone providers, Internet providers, or vendors. Service providers include telecommunications companies, data carriers, wireless communications providers, Internet service providers, and cable television operators offering high-speed Internet access.

In a 5G RAN architecture, the BBU functionality is split into two functional units: a distributed unit (DU) 120, responsible for real time L1 and L2 scheduling functions, and a centralized unit (CU) 118 responsible for non-real time, higher L2 and L3. In a 5G cloud RAN, such as RAN 104, the DU's server and relevant software are hosted on a site, such as base station 108, or are hosted in an edge cloud (e.g., datacenter or central office) depending on transport availability and fronthaul interface. The split between DU 120 and RU 122 are different depending on the specific use-case and implementation.

CU 118 includes the RRC, SDAP (service data adaption protocol that maps the quality of service (QOS)), and PDCP protocol layers, and is responsible for non-real-time RRC, PDCP protocol stack functions. CU 118 is deployed in the cloud to support the integrated deployment of core network UPF (User Plane Function is the function that does the work to connect the data over the RAN to the Internet) sinking and edge computing. CU 118 and DU 120 are connected through the F1 interface. One CU manages one or more DUs.

The DU software is deployed on-site, such as base stations 108, on a COTS (commercial off-the-shelf) server. DU software is normally deployed close to RU 122 on-site and runs the RLC (radio link control), MAC (media access control), and parts of the PHY layer (the layer most closely associated with the physical connection between devices).

RU 122 is the radio hardware unit that coverts radio signals sent to and from antenna 110 into a digital signal for transmission over packet networks. RU 122 handles the digital front end (DFE) and the lower PHY layer, as well as the digital beamforming functionality. RUs are deployed on-site.

Figure 2:
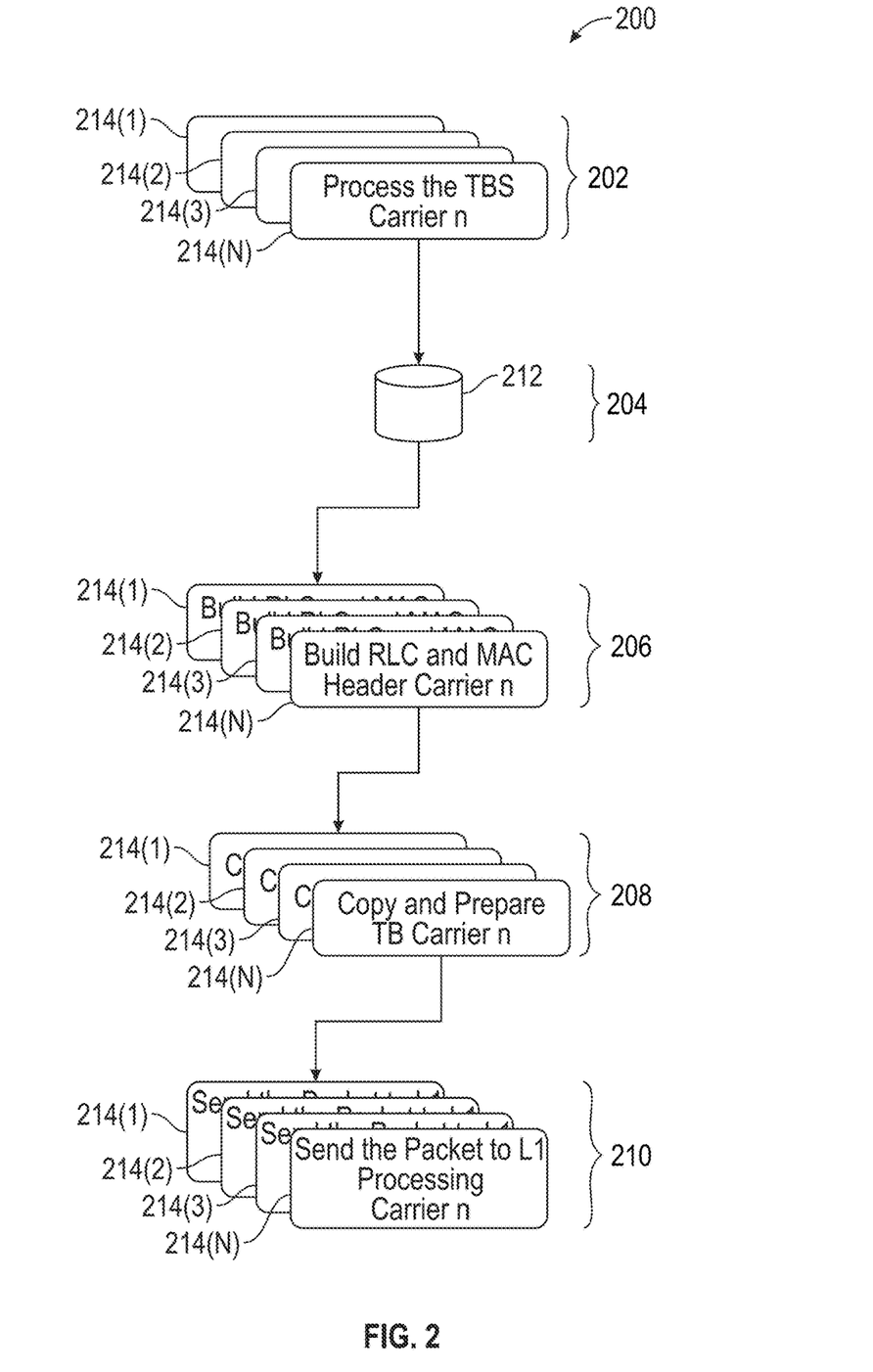
FIG. 2 is flow diagram of a method for CATBP, in accordance with some embodiments.

FIG. 2 is flow diagram of a method for carrier aggregation transport block preparation (CATBP) 200, in accordance with some embodiments.

FIG. 2 is discussed together to provide an understanding of the operation of system for CATBP 100 and DU 120 through method for CATBP 200. In some embodiments, method for CATBP 200 is a functional overview of system for CATBP 100 and DU 120. In some embodiments, method for CATBP 200 is executed by processing circuitry 302 discussed below with respect to FIG. 3. In some embodiments, some, or all the operations of method for CATBP 200 are executed in accordance with instructions corresponding to instructions 306 discussed below with respect to FIG. 3.

Method for CATBP 200 includes operations 202-210, but the operations are not necessarily performed in the order shown. Operations are added, replaced, order changed, and/or eliminated as appropriate, in accordance with the spirit and scope of the embodiments. In some embodiments, one or more of the operations of method for CATBP 200 are repeated. In some embodiments, unless specifically stated otherwise, the operations of method for CATBP 200 are performed in order. In some embodiments, method for CATBP 200 is performed by a DU, such as DU 120.

As discussed in detail above, CA is where a UE is connected to multiple base stations at a time to increase throughput. While the 3GPP standards do not address how packets are received from different base stations, (e.g., pursuant to the standards, the base stations are able to send packets in any fashion), UEs often have an implicit call for a minimum of at least four packets in sequence.

As stated above, in prior approaches, the expectation was to implement a queue per carrier. This implementation means packets are split, assigned sequence numbers to be in sequence for a carrier, stored at the carrier, and then sent out to a UE in sequence. However, this implementation has a lot of drawbacks.

Thus, in some embodiments, a common queue is implemented where the packets are stored in the queue, in sequence, and each carrier dequeues a bulk of packets (e.g., four to eight packets) and then sends the packets out on a carrier.

In the common queue the packets are stored in sequence. A bulk of packets (e.g., four to eight packets), based on the number of bytes and scheduled resources for the UE, is scheduled for each carrier. Those continuous packets are dequeued per carrier, and the TB preparation is performed as discussed above. Thus, there is no call to split the packets, and this makes the handover (or handoff) procedure more efficient. When the packets are stored in a common queue per carrier and retransmitted back to the other carriers, which are active, the result is lower throughput during that time when there is a handover procedure occurring.

In some embodiments, method for CATBP 200 implements a common data que 212 for each carrier to use, making a more efficient network. In operation, a UE calls for a continuous RLC sequence number (SN) per carrier implemented at a gNodeB (e.g., a gNB DU, such as DU 120). In some embodiments, a common data queue 212 is used across carriers 214(1), 214(2), 214(3), through 214(N), where N is a positive integer. Carrier TB preparation is executed in parallel. Dequeuing from common data queue 212 is performed in bulk based on an estimated average packet size and the allocated TBS.

At operation 202 of method for CATBP 200, the TBS is processed for carriers 214(1), 214(2), 214(3), through 214(N) in parallel. A UE receiving data on the PDSCH determines the TBS before attempting to decode the data. The UE uses a combination of semi-static information provided by the RRC (Radio Resource Control is a layer 3 (Network Layer) protocol used between UE and base station) signalling and dynamic information provided by Downlink Control Information (DCI provides the UE with information such as physical layer resource allocation, power control commands, HARQ information for both uplink and downlink) on the PDCCH.

In some embodiments, the TBS are processed for the carrier, such as carriers 214(1), 214(2), 214(3), through 214(N). In some embodiments, a scheduler provides the resources per carrier. Thus, in each carrier resources are allocated for a given UE.

A network scheduler, also called packet scheduler, queueing discipline (qdisc), or queueing algorithm, is an arbiter on a node in a packet switching communication network. The scheduler manages the sequence of network packets in the transmit and receive queues of the protocol stack and network interface controller. The network scheduler logic decides which network packet to forward next. The network scheduler is associated with a queuing system, such as common queue 212, storing the network packets temporarily until they are transmitted. CATBP system 100 has a single common queue 212 which holds the packets of one flow, classification, or priority. Process flows from operation 202 to operation 204.

At operation 204 of method for CATBP 200, in response to resources being allocated, such as the TBS, packets for each carrier, such as carriers 214(1), 214(2), 214(3), through 214(N) are stored in common queue 212. To access common data queue 212, carriers 214(1), 214(2), 214(3), through 214(N) use bulk dequeue (e.g., N number of packets are dequeued at once), based on the TBS allocated and average packet size. The bulk dequeue function is protected mutex and this process is quick and carriers 214(1), 214(2), 214(3), through 214(N) are serialized (e.g., given a sequential serial number). Process flows from operation 202 to operation 204. Process flows from operation 204 to operation 206.

At operation 206 of method for CATBP 200, the RLC and MAC header are built. A transport block is described as the data delivered by the MAC layer to the physical layer and vice versa. In some embodiments, this is the protocol level processing that happens per carrier. At the protocol level the RLC and MAC protocol headers are built in parallel. The payload packets remain in queue 212 and are accessed during method for CATBP 200. Process flows from operation 206 to operation 208.

At operation 208 of method for CATBP 200, the TBs are copied and prepared for each carrier. In response to the dequeue of the RLC/MAC header, updating per packet occurs and TB preparation runs in parallel. In some embodiments, M number of packets per carrier are dequeued (e.g., between four and eight). The number represented by M depends on the grants given by the scheduler. In some embodiments, from queue 212 the TBs are built and queued per carrier. In some embodiments, the RLC and MAC protocol header are added and combined into the TB for the entire resources that are allocated in that slot. Process flows from operation 208 to operation 210.

At operation 210 of method for CATBP 200, the prepared TB is sent to layer one (L1) to do the L1 processing for that slot. In some embodiments, the additional or segmented packet is stored in the UE's carrier context and is transmitted on next DL (downlink) scheduling occasion.

In some embodiments, method for CATBP 200 receives packets (payload) which are kept in common queue 212. Then the RLC SN is assigned while the packets remain in common queue 212. Common queue 212 is accessed by different carriers (e.g., different base stations) in any order. In a non-limiting example, packet sequence 1, 2, 3, and 4, are assigned to carrier one, packet sequence 5, 6, 7, and 8 are assigned to carrier two, packet sequence 9, 10, 11, and 12 are assigned to carrier three, and packet sequence 13, 14, 15, and 16 are assigned to carrier four.

In prior approaches, in the event a carrier goes down right or is not seen by the UE, the packets that are stored in the carrier's queue are moved back to the other carrier queues, and this adds a delay in those packets being sent to the UE. Since the packets that are stored are moved on top of the queue for the other carriers, this reduces the throughput.

However, though use of a common queue, such as in method for CATBP 200 in response to a carrier going down, packets simply aren't sent to the carrier. There is no call to rearrange or transfer those packets to any other scheduler.

Figure 3:
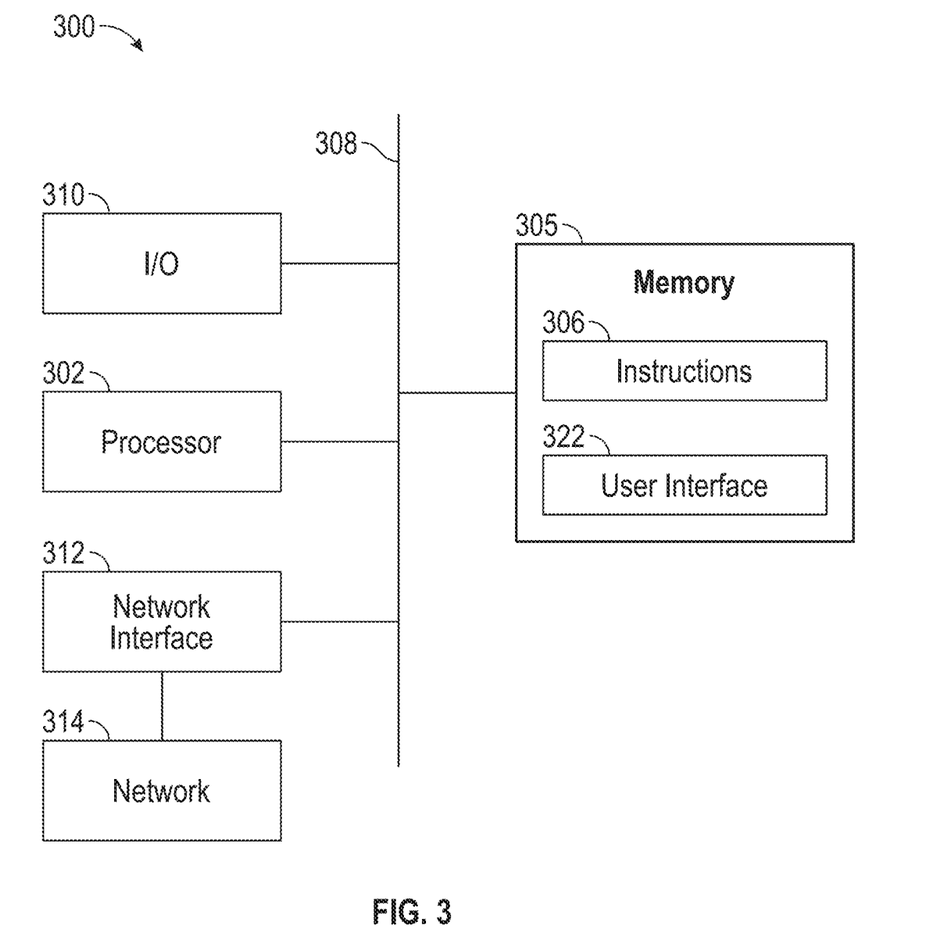
FIG. 3 is a high-level functional block diagram of a processor-based system, in accordance with some embodiments.

FIG. 3 is a block diagram of processing circuitry 300 for carrier aggregation transport block preparation, in accordance with some embodiments. In some embodiments, processing circuitry 300 for carrier aggregation transport block preparation is a general-purpose computing device including a hardware processor 302 and a non-transitory, computer-readable storage medium 304. Storage medium 304, amongst other things, is encoded with, i.e., stores, computer program code 306, i.e., a set of executable instructions such as an algorithm, or method 200. Execution of instructions 306 by hardware processor 302 represents (at least in part) a method for carrier aggregation transport block preparation which implements a portion, or all the methods described herein in accordance with one or more embodiments (hereinafter, the noted processes and/or methods).

Processor 302 is electrically coupled to a computer-readable storage medium 304 via a bus 308. Processor 302 is further electrically coupled to an I/O interface 310 by bus 308. A network interface 312 is further electrically connected to processor 302 via bus 308. Network interface 312 is connected to a network 314, so that processor 302 and computer-readable storage medium 304 connect to external elements via network 314. Processor 302 is configured to execute computer program code 306 encoded in computer-readable storage medium 304 to cause processing circuitry 300 to be usable for performing a portion or all the noted processes and/or methods. In one or more embodiments, processor 302 is a central processing unit (CPU), a multi-processor, a distributed processing system, an application specific integrated circuit (ASIC), and/or a suitable processing unit.

In one or more embodiments, computer-readable storage medium 304 is an electronic, magnetic, optical, electromagnetic, infrared, and/or a semiconductor system (or apparatus or device). For example, computer-readable storage medium 304 includes a semiconductor or solid-state memory, a magnetic tape, a removable computer diskette, a random-access memory (RAM), a read-only memory (ROM), a rigid magnetic disk, and/or an optical disk. In one or more embodiments using optical disks, computer-readable storage medium 304 includes a compact disk-read only memory (CD-ROM), a compact disk-read/write (CD-R/W), and/or a digital video disc (DVD).

In one or more embodiments, storage medium 304 stores computer program code 306 configured to cause processing circuitry 300 to prepare transport blocks for carrier aggregation and to be usable for performing a portion or all the noted processes and/or methods. In one or more embodiments, storage medium 304 further stores information, such as an algorithm which facilitates performing a portion or all the noted processes and/or methods.

Processing circuitry 300 for preparation of transport blocks for carrier aggregation includes I/O interface 310. I/O interface 310 is coupled to external circuitry. In one or more embodiments, I/O interface 310 includes a keyboard, keypad, mouse, trackball, trackpad, touchscreen, and/or cursor direction keys for communicating information and commands to processor 302.

Processing circuitry 300 further includes network interface 312 coupled to processor 302. Network interface 312 allows processing circuitry 300 to communicate with network 314, to which one or more other computer systems are connected. Network interface 312 includes wireless network interfaces such as BLUETOOTH, WIFI, WIMAX, GPRS, or WCDMA; or wired network interfaces such as ETHERNET, USB, or IEEE-864. In one or more embodiments, a portion or all noted processes and/or methods, is implemented in two or more processing circuitry 300.

Processing circuitry 300 for carrier aggregation transport block preparation is configured to receive information through I/O interface 310. The information received through I/O interface 310 includes one or more of instructions, data, design rules, and/or other parameters for processing by processor 302. The information is transferred to processor 302 via bus 308. processing circuitry 300 for carrier aggregation transport block preparation is configured to receive information related to UI 322 through I/O interface 310. The information is stored in computer-readable medium 304 as user interface (UI) 322.

In some embodiments, a method, includes processing, by processing circuitry, in parallel, a transport block size (TBS) for a transport block (TB) of two or more carriers, where the TB is payload on each carrier for user equipment (UE) in communication with the two or more carriers; storing, by the processing circuitry, processed TBS for each carrier in a common data queue; and sending, by the processing circuitry, TBs for each carrier for L1 processing in preparation of the TBs being sent to the UE.

In some embodiments, the processing the TBS for each TB of the two or more carriers comprises managing, by a scheduler, a sequence and number of packets to be placed in the TB, where the sequence and the number of packets determine the TBS.

In some embodiments, the method further includes before the storing the processed TBS for the each carrier in the common data queue, dequeuing, in bulk to the common data queue, packets for each carrier based on the TBS allocated and average packet size.

In some embodiments, the method further includes protecting, by the processing circuitry, the bulk dequeue with a protected mutex; and serializing, by the processing circuitry, each carrier with a sequential number.

In some embodiments, the method further includes in response to the bulk dequeue, building a radio link control (RLC) and media access control (MAC) header for each packet in the TB.

In some embodiments, the method further includes in response to the sending the TBs for the each carrier for the L1 processing in preparation of the TBs being sent to the UE, delivering one or more TBs by a MAC layer to a L1 layer.

In some embodiments, the method further includes in response to the building of the RLC and MAC header for the each packet in the TB, building the TB though dequeuing a number of predetermined bytes granted by the scheduler.

In some embodiments, the building the TB though the dequeuing the number of predetermined bytes granted by the scheduler includes building the TBs per serialized carrier.

In some embodiments, an apparatus, includes a processor; and a memory having instructions stored thereon that, in response to being executed by the processor, cause the apparatus to process in parallel a transport block size (TBS) for a transport block (TB) of two or more carriers, where the TB is payload for user equipment (UE) on each carrier in communication with the two or more carriers; store processed TBS for each carrier in a common data queue; and send TBs for each carrier for L1 processing in preparation of the TBs being sent to the UE.

In some embodiments, the apparatus is caused to process the TBS for each TB of the two or more carriers by managing, by a scheduler, a sequence and number of packets to be placed in the TB, where the sequence and the number of packets determine the TBS.

In some embodiments, the apparatus is further caused to before the storing the processed TBS for each carrier in the common data queue, dequeue, in bulk to the common data queue, packets for each carrier based on the TBS allocated and average packet size.

In some embodiments, the apparatus is further caused to protect the bulk dequeue with a protected mutex; and serialize each carrier with a sequential number.

In some embodiments, the apparatus is further caused to in response to the bulk dequeue, build a radio link control (RLC) and media access control (MAC) header for each packet in the TB.

In some embodiments, the apparatus is further caused to in response to the sending the TBs for the each carrier for the L1 processing in preparation of the TBs being sent to the UE, deliver the TBS by a MAC layer to a L1 layer.

In some embodiments, the apparatus is further caused to in response to the building the RLC and MAC header for the each packet in the TB, build the TB though dequeuing a number of predetermined packets granted by the scheduler.

In some embodiments, the apparatus is caused to build the TB though the dequeuing the number of predetermined packets granted by the scheduler by building the TBs per serialized carrier.

In some embodiments, a non-transitory computer readable medium having instructions stored thereon that, in response to being executed by a processor, cause an apparatus to process in parallel, a transport block size (TBS) for a transport block (TB) of two or more carriers, where the TB is payload for user equipment (UE) in communication with the two or more carriers; store processed TBS for each carrier in a common data queue; and send TBs for each carrier for L1 processing in preparation of the TBs being sent to the UE.

In some embodiments, the apparatus is caused to process the TBS for each TB of the two or more carriers by managing, by a scheduler, a sequence and number of packets to be placed in the TB, where the sequence and the number of packets determine the TBS.

In some embodiments, the apparatus is further caused to before the storing the processed TBS for each carrier in the common data queue, dequeue, in bulk to the common data queue, packets for each carrier based on the TBS allocated and average packet size.

In some embodiments, the apparatus is further caused to protect the bulk dequeue with a protected mutex; and serialize each carrier with a sequential number.

The foregoing outlines features of several embodiments so that those skilled in the art better understand the aspects of the embodiments. Those skilled in the art should appreciate that they readily use the embodiments as a basis for designing or modifying other processes and structures for conducting the same purposes and/or achieving the same advantages of the embodiments introduced herein. Those skilled in the art should further realize that such equivalent constructions do not depart from the spirit and scope of the embodiments, and that they make various changes, substitutions, and alterations herein without departing from the spirit and scope of the embodiments.

What is claimed is:

1. A method, comprising:
processing, by processing circuitry, in parallel, a transport block size (TBS) for a transport block (TB) of two or more carriers, where the TB is payload on each carrier for user equipment (UE) in communication with the two or more carriers;
storing, by the processing circuitry, processed TBS for each carrier in a common data queue;
sending, by the processing circuitry, TBs for each carrier for L1 processing in preparation of the TBs being sent to the UE, wherein:
the processing the TBS for each TB of the two or more carriers comprises:
managing, by a scheduler, a sequence and number of packets to be placed in the TB, where the sequence and the number of packets determine the TBS; and
before the storing the processed TBS for the each carrier in the common data queue, dequeuing, in bulk to the common data queue, packets for each carrier based on the TBS allocated and average packet size.

2. The method of claim 1, further comprising:
protecting, by the processing circuitry, the bulk dequeue with a protected mutex; and
serializing, by the processing circuitry, each carrier with a sequential number.

3. The method of claim 1, further comprising:
in response to the bulk dequeue, building a radio link control (RLC) and media access control (MAC) header for each packet in the TB.

4. The method of claim 3, further comprising:
in response to the sending the TBs for the each carrier for the L1 processing in preparation of the TBs being sent to the UE, delivering one or more TBs by a MAC layer to a L1 layer.

5. The method of claim 3, further comprising:
in response to the building of the RLC and MAC header for the each packet in the TB, building the TB though dequeuing a number of predetermined bytes granted by the scheduler.

6. The method of claim 5, wherein:
the building the TB though the dequeuing the number of predetermined bytes granted by the scheduler comprises:
building the TBs per serialized carrier.

7. An apparatus, comprising:
a processor; and
a memory having instructions stored thereon that, in response to being executed by the processor, cause the apparatus to:
process in parallel a transport block size (TBS) for a transport block (TB) of two or more carriers, where the TB is payload for user equipment (UE) on each carrier in communication with the two or more carriers;
store processed TBS for each carrier in a common data queue;
send TBs for each carrier for L1 processing in preparation of the TBs being sent to the UE,
wherein the apparatus is caused to process the TBS for each TB of the two or more carriers by:
managing, by a scheduler, a sequence and number of packets to be placed in the TB, where the sequence and the number of packets determine the TBS; and
before the storing the processed TBS for each carrier in the common data queue, dequeue, in bulk to the common data queue, packets for each carrier based on the TBS allocated and average packet size.

8. The apparatus of claim 7, wherein the apparatus is further caused to:
protect the bulk dequeue with a protected mutex; and
serialize each carrier with a sequential number.

9. The apparatus of claim 7, wherein the apparatus is further caused to:
in response to the bulk dequeue, build a radio link control (RLC) and media access control (MAC) header for each packet in the TB.

10. The apparatus of claim 9, wherein the apparatus is further caused to:
in response to the sending the TBs for the each carrier for the L1 processing in preparation of the TBs being sent to the UE, deliver the TBS by a MAC layer to a L1 layer.

11. The apparatus of claim 9, wherein the apparatus is further caused to:
in response to the building the RLC and MAC header for the each packet in the TB, build the TB though dequeuing a number of predetermined packets granted by the scheduler.

12. The apparatus of claim 11, wherein the apparatus is caused to build the TB though the dequeuing the number of predetermined packets granted by the scheduler by:
building the TBs per serialized carrier.

13. A non-transitory computer readable medium having instructions stored thereon that, in response to being executed by a processor, cause an apparatus to:
process in parallel, a transport block size (TBS) for a transport block (TB) of two or more carriers, where the TB is payload for user equipment (UE) in communication with the two or more carriers;
store processed TBS for each carrier in a common data queue;
send TBs for each carrier for L1 processing in preparation of the TBs being sent to the UE,
wherein the apparatus is caused to process the TBS for each TB of the two or more carriers by:
managing, by a scheduler, a sequence and number of packets to be placed in the TB, where the sequence and the number of packets determine the TBS; and
before the storing the processed TBS for each carrier in the common data queue, dequeue, in bulk to the common data queue, packets for each carrier based on the TBS allocated and average packet size.

14. The non-transitory computer readable medium of claim 13, wherein the apparatus is further caused to:
protect the bulk dequeue with a protected mutex; and
serialize each carrier with a sequential number.

* * * * *